United States Patent Office

2,837,416
Patented June 3, 1958

2,837,416

VITRIFIED BONDED SILICON CARBIDE ABRASIVE ARTICLES

Guy Ervin, Jr., Shrewsbury, Mass., assignor to Norton Company, Worcester, Mass., a corporation of Massachusetts No Drawing. Application October 13, 1954
Serial No. 462,111

6 Claims. (Cl. 51—308)

The invention relates to vitrified bonded silicon carbide abrasive articles especially grinding wheels. This is a continuation-in-part of my copending application Serial No. 320,110 filed November 12, 1952 and now abandoned.

One object of the invention is to produce vitrified bonded silicon carbide grinding wheels in which the bond is insoluble in water and is stable under all normal conditions of use. Another object is to produce more strongly bonded vitrified bonded silicon carbide grinding wheels. Another object is to produce such grinding wheels with less bond for a given strength, thus producing grinding wheels which are freer cutting and have better grinding quality than those formerly made. Another object is to permit the manufacture of a wide range of vitrified bonded silicon carbide grinding wheels, thus to produce many new grinding wheels which have superior quality for many diverse grinding operations.

Another object is to reduce the firing time required for the vitrification of vitrified bonded silicon carbide grinding wheels. Another object is to achieve greater control in the manufacture of vitrified bonded silicon carbide grinding wheels, thus reducing rejections and insuring the manufacture of only superior wheels. Another object is to provide a process permitting the manufacture of silicon carbide grinding wheels with a glassy bond over a wide range of grade hardness and abrasive packing.

Another object of the invention is to produce vitrified bonded silicon carbide grinding wheels which are exceptionally free cutting. Another object of the invention is to provide a bond for the manufacture of vitrified bonded silicon carbide grinding wheels permitting substantial duplication of the product, that is to say maintaining the physical characteristics of hundreds of thousands of wheels substantially the same within reasonably close limits.

Another object of the invention is to produce vitrified silicon carbide grinding wheels in which the vitrified bond is essentially all glass. Another object is to produce a glassy-bonded silicon carbide grinding wheel having about 60 volume percent or more of abrasive. Another object is to produce hard grades of silicon carbide grinding wheels even though employing only low volume percentage of bond.

Other objects will be in part obvious or in part pointed out hereinafter.

Potash is a particularly advantageous alkali oxide to employ in the bond, since there is less tendency to swell with it than with other practical alkali oxides. It is preferred that $K_2O$ be present in an amount greater than that of any other single alkali oxide present and compositions according to my invention should have one percent or more $K_2O$ in the bond of the fired article. With this proviso it should be understood that other alkali oxides can be used.

The glass-type bond which is the essence of this invention is to be distinguished sharply from the porcelanic-type bond which is the type well known to the industry as a bond for silicon carbide abrasive. There are important differences in the appearances of silicon carbide articles bonded with these two types of bond. In articles having porcelanic bond the grains are not covered as smoothly or completely as is the case with the glass-type bond and the porcelanic bond often appears opaque, usually white. These features can be seen with the unaided eye, or better with a binocular microscope. Observation of broken fragments of bond with a petrographic microscope makes it possible to determine more or less quantitatively the proportion of glass and crystalline material present. In this way it is found that a porcelanic bond usually contains upward of 20% to 30% crystalline material while a glass-type bond is either all glass or contains a maximum of 10% to 15% by volume crystalline material or an amount such that the crystalline particles do not rub upon each other significantly to restrict the flow of the bond. The proportion of crystalline material in the porcelanic bond is high enough to make the bond retain its shape during firing and for this reason the bond does not coat the abrasive grains smoothly, while on the other hand the glass-type bond deforms and flows during firing and does coat the abrasive grains smoothly.

One novel feature of the invention is the achievement of glassiness in the bond for silicon carbide articles covering a range of grades of hardness. Another novel feature is a glass bond for hard grade silicon carbide products which does not contain "protective agents."

Previous attempts to manufacture silicon carbide abrasive articles with an all glass bond or a glass-type bond have resulted in extremely poor bonding presumably because of the interaction of silicon carbide with the fluid bond and with oxidizing components of the atmosphere during maturing in a kiln. The poor bonding is due to one or both of two types of effects, vesicularity in the bond making it soft and friable, or carbon deposition at the bond-glass interface causing poor adhesion between the silicon carbide abrasive grains and the glass bond.

Some advantages of a glass bond as compared with typical porcelanic bonds now used for this type of product are as follows: (1) Being essentially liquid at the highest temperature, instead of a mixture of liquid and solid in which the solid particles rub upon one another, the bond flows more freely and wets the abrasive grains more smoothly and uniformly, thus requiring less bond for the same strength of bonding or "hardness" of grinding action. Lower bond content means greater porosity, thus freer cutting action and better grinding quality. (2) A glass bond is essentially liquid at its maturing temperature and will undergo little further change on heating for a longer period of time or to a somewhat higher temperature. A porcelanic bond, however, having a framework of solid particles that are in contact with one another, contains relatively more liquid and less solid the higher it is heated. Thus the properties of products having a glass bond show less sensitivity to variations in manufacturing conditions. Both of these advantages have been realized in tests of products made according to the described procedure.

The invention has been found particularly useful for products made with coarse grit silicon carbide, specifically products in which at least two-thirds of the grain is grit size No. 30 or coarser.

While the description of the invention has been restricted to products made with silicon carbide abrasive, it is to be understood that other types of abrasive can be mixed in with silicon carbide, and the products will still fall within the scope of this invention. A product in which at least 75% by volume of the granular constituent is silicon carbide would be considered a silicon carbide abrasive article as the term is used herein.

More completely to explain the present invention I will now give specific examples of the manufacture of grinding wheels in accordance therewith.

EXAMPLE I

Using a vertical spindle mixer employing a rotating pan and stationary plows, 80 pounds of 14 grit silicon carbide abrasive was mixed, first with 5 pounds of a potassium silicate solution containing 26.8% $SiO_2$ and 12.6% $K_2O$, followed by 3.7 pounds of a mixture of 9 parts of Florida kaolin with one part of dry sodium silicate powder ($Na_2O \cdot 3.22SiO_2$). In this method of mixing, the grains are coated with the sticky potassium silicate solution and in this condition readily pick up a uniform coating of the dry powdered ingredients. The resulting mix is one in which the individual grains are relatively dry on the outside but because of the moisture under the powder coating, the grains stick together firmly when compressed.

The composition of the bond at this point was as follows, on the dry basis:

Table I
[Bond composition, unfired wheel.]

| | Percent |
|---|---|
| $SiO_2$ | 60.6 |
| $Al_2O_3$ | 24.2 |
| $Na_2O$ | 1.7 |
| $K_2O$ | 12.3 |
| $Fe_2O_3$, $TiO_2$, CaO, MgO | 1.2 |

A portion of the mix was then pressed in a mold to form a wheel 24 inches in diameter by 2 inches thick with a 2½ inch hole. The weight of wet mix put into the mold was such that the apparent density of the freshly molded article was 2.33 grams per cubic centimeter. The molded wheel now had the following composition and structure, on a dry basis:

Table II
93.9 wt. percent silicon carbide
6.1 wt. percent bond 65.8 vol. percent silicon carbide
5.7 vol. percent bond
28.5 vol. percent pores The wheel was then fired in a large tunnel kiln on an 8 day cycle receiving a heat treatment of cone 16. The fired wheel was quite black with no surface disturbances. It had the following properties.

Table III

| | |
|---|---|
| Weight per unit volume | 2.25 gm./cc. |
| Modulus of elasticity | $92 \times 10^{10}$ dynes/sq. cm. |
| Gain in weight | 2.6% |
| Dimensional changes | 2.0 vol. percent growth |
| Weight percent silicon carbide by analysis | 86.5% |
| Weight percent bond by analysis | 13.5% |

The chemical analysis of the bond in the fired wheel was found to be:

Table IV

| | Percent |
|---|---|
| $SiO_2$ | 82.8 |
| $Al_2O_3$ | 10.3 |
| $Na_2O$ | 1.0 |
| $K_2O$ | 4.0 |
| $Fe_2O_3$, $TiO_2$, CaO, MgO | 1.9 |

From these data the final structure of the wheel was calculated:

Table V
60.8 volume percent silicon carbide
12.6 volume percent bond
26.6 volume percent pores Microscopic examination showed that the bond was nearly all glass, with traces of mullite crystals.

A group of such wheels, subjected to a standard snagging wheel grinding test had 38% higher grinding quality number than similar wheels made with present commercial porcelanic-type bonds. These wheels were free cutting. As explained in a number of patents, the quality number is the square of material removed divided by the wheel wear, the former in pounds per hour, and the latter in cubic inches per hour, which has been deemed to measure the economic value of a grinding wheel when grinding wheels of a given grade of hardness are compared as was the case here.

Another group of similar wheels manufactured over a period of time showed only one-fourth the variation in physical properties that occurs with porcelanic-type-bonded wheels.

EXAMPLE II

The following example is one in which a proportion of the bond is an inert material which remains solid and undissolved during firing and is present in the final product as crystalline particles dispersed in the glass bond. The inert material is added deliberately to increase the volume of bond without increasing the volume of fluid glass present at the top firing temperature.

Mixing, molding and firing were substantially as described in Example I but the mix had the following composition:

Table VI
16.6 lbs. 20-grit silicon carbide abrasive
1.6 lbs. 40% potassium silicate solution
0.9 lb. Florida kaolin
0.25 lb. milled zircon This was pressed to an apparent density of 2.34 grams per cubic centimeter. After firing, the product had good properties similar to the wheel in Example I.

Materials other than zircon can be used, such as fine silicon carbide, vitreous silica, potter's flint, and others.

EXAMPLE III

It is not essential that the clay used be Florida kaolin or even a kaolin, although alumina is thought to be a desirable constituent, and kaolin has high alumina. However, clay of lower alumina content may be used successfully as in the following example, in which mixing, molding and firing were substantially as described in Example I but the composition was:

Table VII
10 lbs. 20-grit silicon carbide
0.4 lb. Mississippi ball clay
0.7 lb. 40% potassium silicate solution Articles made in this way had physical properties very similar to those made according to the procedure of Example I.

EXAMPLE IV

Although it is convenient to add the potassium silicate in the form of a solution, principally because of the high green strength it imparts to the molded articles, it may be added as the dry powder. The following mix composition has been molded and fired successfully:

Table VIII
8 lbs. 20-grit silicon carbide
0.31 lb. potassium silicate powder
0.43 lb. Florida kaolin
0.28 lb. water
0.08 lb. dextrine The mix was made up in accordance with procedure which has been standard for some time, that is to say the silicon carbide was placed in a mixer and was then wet with the water containing the dextrine in solution and, while the mixer was still operating, a mixture of the dry potassium silicate and Florida kaolin powders was sifted in until the individual granules of silicon carbon were coated. Then this mixture was molded in the usual way, the molded wheels were dried and thereafter vitrified under cone 16 conditions.

One way by which the objects and advantageous features of this invention are achieved, is to provide a vitrified bond analyzing for silica, alumina, potash and other alkali oxides within the following limits.

Table IX

|  | Percentage by weight |
|---|---|
| Silica, $SiO_2$ | 50 to 90 |
| Alumina, $Al_2O_3$ | 4 to 20 |
| Potash, $K_2O$ | at least 1 |
| Total alkali oxides, $K_2O$, $Na_2O$, $Li_2O$, $Rb_2O$, $Cs_2O$ | 2 to 15 |

Sixty volume percent to sixty-seven volume percent of the wheel or other abrasive article of the invention should be abrasive. However, it is not necessary that all of this abrasive be silicon carbide although it is preferable that substantially all of it shall be. It will be sufficient if at least 75% by volume of the abrasive content is silicon carbide abrasive grains. At least two-thirds by volume of the silicon carbide abrasive should be at least as coarse as No. 30 grit size, but the remainder can be finer in some cases and, of course, in any batch of abrasive grains no matter how carefully sized there are some fines, usually a fair percentage, of material finer than the grit size selected.

The glass bond forms a coating on the abrasive grains smoothly coating them because of flow during firing since residual crystalline particles have not been present in the bond in sufficient amount to rub on each other significantly to restrict the flow of bond during its maturing in the kiln.

The volume percentage of the abrasive above given is a high volume percentage of abrasive for a vitrified silicon carbide abrasive wheel. The bond content should be low and ought to be no more than 20 volume percent of the wheel or other abrasive body. It can even be as low as 2 volume percent. Heretofore hard grade wheels were made by providing a large percentage of bond so this invention goes counter to well established practice. I have found that I can produce hard grade wheels by using a high percentage of abrasive and a low percentage of bond and have more strongly bonded wheels than hard grade wheels which were made with a high percentage of bond and thus I am able to achieve the desired objectives without prior undesirable properties.

In chemical composition the glass bond is desirably from 50% to 90% by weight silica meaning by analysis $SiO_2$, from 4% to 25% by weight alumina, from 2% to 15% by weight alkali oxide with at least 1% $K_2O$, and from 1% to 15% by weight other flux, all by analysis. Desirably the glass bond is at least 90% by volume glass without crystalline material and more desirably there is no crystalline material at all.

With regard to the "other flux," kaolin contains some and fluxes include boric oxide, manganese oxide, and alkali earth oxides (those of calcium, magnesium, strontium, and barium).

By stating that total alkali oxides are desirably from 2% to 15% and by listing the five alkali oxides, which are the only strictly speaking alkali oxides, in Table IX, I do not mean that the bond or the glass must have all of these alkali oxides, merely that the composition has from 2% to 15% of total alkali oxide whether one, two, three, four or all five of those listed but the claims also state that there must be at least 1% of $K_2O$. For example all of the alkali oxide might be $K_2O$ but usually a good portion thereof will be $Na_2O$. Naturally lithium oxide, rubidium oxide and cesium oxide will usually be present, if at all, in minor proportions.

Other glassy bonds can be made from ingredients such as those comprising $K_2O$, $SiO_2$, $Al_2O_3$, alkali earth oxide, boric oxide, manganese oxide, etc. Examples are in the range from 50% to 70% $SiO_2$, 10% to 25% $Al_2O_3$, 3% to 15% alkali oxide including over 1% $K_2O$, together with at least 1% of other flux comprising up to 5% alkali earth oxide, up to 5% boric oxide, and up to 5% manganese oxide, all percentages being by weight.

I mix ceramic raw ingredients containing components in the above range in the customary way previously described and mold abrasive products. I am able to produce hard grade products with low bond contents, the products containing usually less than 20 weight percent of glassy bond, or from 2 to 20 volume percent of glassy bond with 60 volumes percent or more of abrasive present. This novel combination of ingredients and structure in the product avoids swelling and coring heretofore experienced, the chemical reactivity of the bond with silicon carbide being low.

It will thus be seen that there has been provided by this invention vitrified bonded silicon carbide abrasive articles and grinding wheels in accordance with which the various objects hereinabove set forth together with many thoroughly practical advantages are successfully achieved. As many possible embodiments may be made of the above invention and as many changes might be made in the embodiments above set forth, it is to be understood that all matter hereinbefore set forth is to be interpreted as illustrative and not in a limiting sense.

I claim:

1. A fired grinding wheel or other abrasive article comprising abrasive grains at least 75% by volume of which are silicon carbide abrasive grains, at least two-thirds by volume of said silicon carbide grains being at least as coarse as No. 30 grit size, and glassy bond of composition from 50% to 90% by weight silica, from 4% to 25% by weight alumina, from 2% to 15% by weight alkali oxide flux with at least 1% $K_2O$, and from 1% to 15% by weight of other flux, said glassy bond containing an insufficient amount of crystalline particles to restrict the free flow of the bond during firing, said abrasive grains being bound together in a matrix of said glassy bond which forms a smooth coating on said abrasive grains as the result of said free flow during firing, said abrasive grains constituting from 60 volume percent to 67 volume percent of the wheel and said bond constituting from 2 volume percent to 20 volume percent of the wheel, said wheel being a hard grade silicon carbide wheel.

2. A fired grinding wheel or other abrasive article according to claim 1 in which at least 90% by volume of the bond is glass.

3. A fired grinding wheel or other abrasive article according to claim 2 in which the bond is substantially all glass.

4. A fired grinding wheel or other abrasive article according to claim 3 in which the abrasive grains are substantially all silicon carbide abrasive grains.

5. A fired grinding wheel or other abrasive article according to claim 1 in which the abrasive grains are substantially all silicon carbide abrasive grains.

6. A fired grinding wheel or other abrasive article according to claim 5 in which at least 90% by volume of the bond is glass.

References Cited in the file of this patent

UNITED STATES PATENTS

| 1,983,082 | Howe et al. | Dec. 4, 1934 |
| 1,987,861 | Milligan et al. | Jan. 15, 1935 |
| 2,132,005 | Milligan et al. | Oct. 4, 1938 |
| 2,140,650 | Quick et al. | Dec. 20, 1938 |
| 2,158,034 | Milligan et al. | May 9, 1939 |